United States Patent
Atkinson et al.

(10) Patent No.: US 8,524,120 B2
(45) Date of Patent: Sep. 3, 2013

(54) SINGLE CONDUCTIVE PELLETS OF LONG GLASS FIBER REINFORCED THERMOPLASTIC RESIN AND MANUFACTURING METHOD THEREOF

(75) Inventors: Paul Atkinson, Columbus, IN (US);
Stephen Jones, Middlesbrough (GB);
Michael Kennedy, North Brabant (NL);
Domenico La Camera, Breda (NL)

(73) Assignee: Sabic Innovative Plastics IP B.V. (NL)

( * ) Notice: Subject to any disclaimer, the term of this patent is extended or adjusted under 35 U.S.C. 154(b) by 478 days.

(21) Appl. No.: 12/818,674

(22) Filed: Jun. 18, 2010

(65) Prior Publication Data

US 2010/0327235 A1  Dec. 30, 2010

Related U.S. Application Data

(60) Provisional application No. 61/218,467, filed on Jun. 19, 2009.

(51) Int. Cl.
*H01B 1/00* (2006.01)
*H01B 1/06* (2006.01)

(52) U.S. Cl.
USPC .......................................... 252/500; 252/511

(58) Field of Classification Search
USPC ............................................ 252/500–521.6
See application file for complete search history.

(56) References Cited

U.S. PATENT DOCUMENTS

| | | | |
|---|---|---|---|
| 4,559,262 A | 12/1985 | Cogswell et al. | |
| 5,019,450 A | 5/1991 | Cogswell et al. | |
| 5,204,396 A * | 4/1993 | Murakami et al. | 524/394 |
| 5,213,889 A | 5/1993 | Cogswell et al. | |
| 5,514,745 A | 5/1996 | Yoshino | |
| 5,658,481 A | 8/1997 | Pfeiffer et al. | |
| 5,958,303 A | 9/1999 | Narkis et al. | |
| 6,153,683 A | 11/2000 | Enomoto | |
| 6,528,572 B1 | 3/2003 | Patel et al. | |
| 6,689,835 B2 | 2/2004 | Amarasekera et al. | |
| 7,462,656 B2 | 12/2008 | Keulen et al. | |
| 2006/0280938 A1 * | 12/2006 | Atkinson | 428/364 |
| 2007/0007495 A1 | 1/2007 | Hayes | |
| 2007/0203282 A1 | 8/2007 | Bradley et al. | |
| 2008/0116424 A1 | 5/2008 | Bandyopadhyay et al. | |
| 2008/0142494 A1 | 6/2008 | Blake et al. | |
| 2008/0221254 A1 | 9/2008 | El-Zayatie et al. | |
| 2009/0131569 A1 * | 5/2009 | Schwitter et al. | 524/423 |

FOREIGN PATENT DOCUMENTS

| | | | |
|---|---|---|---|
| EP | 0874024 | | 10/1998 |
| JP | 10195311 A | * | 7/1998 |
| JP | 10196311 | | 7/1998 |

OTHER PUBLICATIONS

International Search Report; International Application No. PCT/US2010/039309; International Filing Date: Jun. 21, 2010; Date of Mailing: Sep. 15, 2010; 4 Pages.
Written Opinion of the International Searching Authority; International Application No. PCT/US2010/039309; International Filing Date: Jun. 21, 2010; Date of Mailing: Sep. 15, 2010; 7 Pages.

* cited by examiner

*Primary Examiner* — Mark Kopec
*Assistant Examiner* — Jaison Thomas
(74) *Attorney, Agent, or Firm* — Cantor Colburn LLP

(57) ABSTRACT

Single pellets of a thermoplastic resin containing long glass fibers and a conductive filler are set forth that enable molded articles made from these pellets to exhibit conductivity and, at the same time, high mechanical properties. These pellets have mechanical properties that are substantially equivalent to non-conductive pellets of a thermoplastic resin containing same loading of long glass and provide conductivity that is substantially equivalent to articles obtained by blending two kinds of pellets, one pellet having a conductive filler and the other pellet one containing long glass fibers. The pellets include a thermoplastic resin, a long fiber reinforcing filler and a conductive additive dispersed in the pellet.

10 Claims, No Drawings

SINGLE CONDUCTIVE PELLETS OF LONG GLASS FIBER REINFORCED THERMOPLASTIC RESIN AND MANUFACTURING METHOD THEREOF

CROSS REFERENCE TO RELATED APPLICATIONS

The present application claims priority to U.S. Provisional Patent Application No. 61/218,467 filed Jun. 19, 2009, which is hereby incorporated by reference in its entirety.

FIELD OF THE INVENTION

The present invention relates to thermoplastic compositions, and in particular to long glass fiber reinforced thermoplastic compositions pellets containing a conductive filler. The present invention also relates to methods of manufacturing these pellets and articles that include made from these pellets.

BACKGROUND OF THE INVENTION

Conductive thermoplastic resin compositions utilizing a mixture of a thermoplastic resin with a conductive material have been used to form various articles using injection molding or injection-compression molding processes. These compositions and processes offer advantages such as low cost and/or the ability to mass-produce these articles.

Further, conductive thermoplastic resins have also been used as a metal substitute in lieu of fabricated metal articles and conductive surface-fabricated articles treated with a conductive coating material or metal plating. However, these conductive thermoplastic resins often had issues of low mechanical strength, thereby limiting their use despite their lower cost and ease of manufacture.

The prior art attempted to remedy these issues and improve the strength of conductive thermoplastic resins through the addition of fibrous reinforcing materials such as glass fiber. However, obtaining single conductive pellets of long glass fiber-reinforced thermoplastic resin is difficult. Pellets of long glass fiber-reinforced thermoplastic are generally obtained via pultrusion. Pultrusion is a process for manufacturing composite materials in which the reinforcing fibers are pulled through a resin and into a heated die and then pelletized to form the pellets. However, conductive fillers, such as carbon black, are often detrimental to mechanical properties despite the reinforcing fiber. In addition, the conductive filler interferes, during the pultrusion process, with impregnation of the glass fiber, causing further degradation of the mechanical properties.

To avoid this issue, most long fiber reinforced materials incorporate the additive into a separate pellet that is then dry-blended with the fiber-reinforced pellet to form a mix that is then used in the injection molding process. However, these dry blends present several problems. First producing two kinds of pellets is more expensive and complex. Second, it is likely that the kinds of pellets have different density, in particular the pellets containing long glass fibers are likely to be have higher density than the pellets containing the conductive filler, and therefore it is likely that de-mixing of the different kinds of pellets will occur during storage or handling. As a result, the final article may often have inhomogeneous properties.

Accordingly, it would be beneficial to provide a single pellet solution that eliminates the disadvantages of dry blends to form long fiber reinforced conductive articles. It would also be beneficial to provide a single pellet solution that helps reduce fiber breakage thereby enabling the advantages of the long fibers in the long fiber reinforced conductive articles to be maintained. It would also be beneficial to provide a method of making a single pellet incorporating a conductive filler and long fibers such that the resulting molded article using these pellets has enhanced properties as compared to molded articles manufactured using a dry blend.

BRIEF SUMMARY OF THE INVENTION

The present invention provides single pellets of a thermoplastic resin containing long glass fibers and a conductive filler that enable molded articles made from these pellets to exhibit conductivity and high mechanical properties. These pellets may be used to form molded articles that have mechanical properties that are substantially equivalent to articles made using non-conductive pellets of a thermoplastic resin containing same loading of long glass. These pellets may also be used to form molded articles that provide conductivity that is substantially equivalent to articles obtained by blending two kinds of pellets, one pellet having a conductive filler and the other pellet one containing long glass fibers. The pellets include a thermoplastic resin, a long fiber reinforcing filler aligned substantially along the longitudinal axis of the pellets and a conductive additive dispersed in the pellet.

Accordingly, in one aspect, the present invention provides a pellet including from 30 to 70 wt % of a thermoplastic resin; from 20 to 60 wt % of a plurality of long reinforcing fibers aligned substantially parallel along a longitudinal axis of the pellet and having a length of at least 0.4 mm; and up to 10 wt % of a conductive filler dispersed in the pellet.

In another aspect, the present invention provides a method of forming a single conductive fiber reinforced pellet including the steps of extruding from 30 to 70 wt % of a thermoplastic resin with up to 10 wt % of a conductive filler to disperse the conductive filler in the thermoplastic resin and form a resin mixture; pulling from 20 to 60 wt % of reinforcing fibers through the resin mixture and into a heated die; and pelletizing the fiber reinforced resin mixture to form the single conductive fiber reinforced pellets such that the reinforcing fibers have a length of at least 0.4 mm.

In yet another aspect, the present invention provides an article of manufacture made from a pellet including from 30 to 70 wt % of a thermoplastic resin; from 20 to 60 wt % of a plurality of long reinforcing fibers aligned substantially parallel along a longitudinal axis of the pellet and having a length of at least 0.4 mm; and up to 10 wt % of a conductive filler dispersed in the pellet.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention addresses the problems of prior art materials and provides methods of obtaining single pellets of a thermoplastic resin containing long glass fibers and a conductive filler such that molded articles made from these pellets show conductivity and, at the same time, high mechanical properties. These pellets have mechanical properties that are substantially equivalent to non-conductive pellets of a thermoplastic resin containing same loading of long glass, and/or are substantially equivalent to articles obtained by blending two kinds of pellets, one pellet having a conductive filler and the other pellet one containing long glass fibers.

Accordingly, in one aspect, the present invention provides single pellets comprising long glass fiber reinforced thermoplastic resin and a conductive filler. In another aspect, the present invention provides methods of making the same. The pellets include a thermoplastic resin, a long fiber reinforcing filler and a conductive additive. Injection-molded articles produced with these pellets show lower values of resistivity (i.e. are more conductive) and mechanical properties that are equivalent or higher than injection-molded articles produced using a dry-blend solution and/or equivalent to pellets containing approximately same amount of glass, but no conductive filler. In addition, injection-molded articles produced with these single-pellets may be successfully electrostatically painted thereby enabling them to have substantial utility in many metal-replacement applications.

Accordingly, in one aspect, the thermoplastic compositions of the present invention include a thermoplastic resin that includes an organic polymer. The thermoplastic resin is selected as the base material for the composition. Examples of thermoplastic resins that may be used in the present invention include, but are not limited to, polyamides and polyamide blend resins.

Accordingly, in one embodiment, polyamides are used as the organic polymers in the conductive composition. Polyamides are generally derived from the polymerization of organic lactams having from 4 to 12 carbon atoms. Suitable lactams are represented by the formula (I)

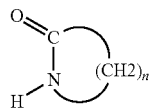
(I)

wherein n is from 3 to 11. In one embodiment the lactam is epsilon-caprolactam having n equal to 5.

Polyamides may also be synthesized from amino acids having from 4 to 12 carbon atoms. Suitable amino acids are represented by the formula (II)

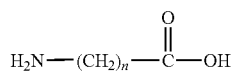
(II)

wherein n is from 3 to 11. In one embodiment the amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. Suitable aliphatic diamines are represented by the formula (III)

$$H_2N-(CH_2)_n-NH_2 \quad (III)$$

wherein n is about 2 to about 12. In one embodiment the aliphatic diamine is hexamethylenediamine ($H_2N(CH_2)_6NH_2$). It is useful that the molar ratio of the dicarboxylic acid to the diamine be 0.66 to 1.5. Within this range it is generally beneficial to have the molar ratio be greater than or equal to 0.81 in one embodiment, greater than or equal to about 0.96 in another embodiment. Also beneficial within this range is an amount of less than or equal to 1.22, beneficially less than or equal to 1.04. Useful polyamides are nylon 6, nylon 6,6, nylon 4,6, nylon 6, 12, nylon 10, or the like, or combinations including at least one of the foregoing nylons.

Synthesis of polyamideesters may also be accomplished from aliphatic lactones having from 4 to 12 carbon atoms and aliphatic lactams having from 4 to 12 carbon atoms. The ratio of aliphatic lactone to aliphatic lactam may vary widely depending on the selected composition of the final copolymer, as well as the relative reactivity of the lactone and the lactam. In one embodiment the initial molar ratio of aliphatic lactam to aliphatic lactone is from 0.5 to 4. Within this range a molar ratio of greater than or equal to 1 may be beneficial. Also beneficial is a molar ratio of less than or equal to 2.

The conductive precursor composition may further include a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst is required.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1$-$C_{12}$ alkyl), sodium dihydrobis (2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_{12}$ alkyl), diols (HO—R—OH; wherein R is R is $C_1$-$C_{12}$ alkylene), omega-aminocaproic acids, and sodium methoxide.

For the synthesis of polyamideesters from lactones and lactams, suitable catalysts include metal hydride compounds, such as a lithium aluminum hydride catalysts having the formula $LiAl(H)_x(R^1)_y$, where x is about 1 to about 4, y is about 0 to about 3, x+y is equal to 4, and $R^1$ is selected from the group consisting of $C_1$-$C_{12}$ alkyl and $C_1$-$C_{12}$ alkoxy; in alternative embodiments the catalysts include $LiAl(H)(OR^2)_3$, wherein $R^2$ is selected $C_1$-$C_8$ alkyl; an especially useful catalyst is $LiAl(H)(OC(CH_3)_3)_3$. Other suitable catalysts and initiators include those described above for the polymerization of poly(epsilon-caprolactam) and poly(epsilon-caprolactone).

The amount of the thermoplastic resin added to the thermoplastic compositions used in the present invention may be based on the selected properties of the thermoplastic compositions as well as molded articles made from these compositions. Other factors include the amount and/or type of flame retardant used, the amount and/or type of flame retardant used, the amount and/or type of reinforcing agent used, and/ or the amount and presence of other components in the thermoplastic compositions. In one embodiment, the thermoplastic resin is present in amounts of from 30 to 99 wt. %. In another embodiment, the thermoplastic resin is present in amounts from 50 to 99 wt. %. In still another embodiment, the thermoplastic resin is present in amounts from 60 to 80 wt. %.

In addition to the thermoplastic resin, the pellets of the present invention also include a reinforcing fiber. In one embodiment, the reinforcing fiber is a glass fiber, although other reinforcing fibers may also be used such as carbon fiber and/or aramid fiber. In exemplary embodiments, the glass fiber used in the invention may be selected from E-glass, S-glass, AR-glass, T-glass, D-glass and R-glass. The diameter of the fiber may range from 5 to 35 μm. In an alternative embodiment, the diameter of the glass fibers may range from 10 to 20 μm. In this area where a thermoplastic resin is reinforced with glass fibers in a composite form, fibers having a length of 0.4 mm are generally referred to long fibers, and shorter ones are referred to short fibers. In alternative embodiments of the present invention, the fibers have a length of 1 mm or longer. In other alternative embodiments of the present invention, the fibers have a length of 2 mm or longer.

The glass fiber used in select embodiments of the invention may, in alternative embodiments, be surface-treated with a surface treatment agent containing a coupling agent. Suitable coupling agents include, but are not limited to, silane-based coupling agents, titanate-based coupling agents or a mixture thereof. Applicable silane-based coupling agents include aminosilane, epoxysilane, amidesilane, azidesilane and acrylsilane.

The amount of reinforcing fiber used in the thermoplastic composition is dependent on one more factors including, but not limited to, the thermoplastic resin used, the type of conductive filler used, and/or the presence of any other additives or fillers. In one embodiment, the amount of reinforcing fiber is from 5 to 60% by weight of the thermoplastic composition. In another embodiment, the amount of reinforcing fiber is from 10 to 50% by weight of the thermoplastic composition. In still another embodiment, the amount of reinforcing fiber is from 20 to 45% by weight of the thermoplastic composition.

As the pellets of the present invention are formed from a pultrusion process, the fibers are aligned substantially parallel to the longitudinal axis of the pellet. As such, fiber length can be maintained based upon the length of the pellet, thereby helping to ensure the fibers are capable of providing the selected reinforcement characteristics. For example, as the pellets are extruded prior to injection molding, this extrusion will cause breakage of some of the fibers. If a molded article is selected to have fibers of a given length, then the pellet length can be selected accordingly to account for this breakage.

In addition to the thermoplastic resin and the reinforcing fibers, the pellets of the present invention include a conductive filler, such as carbon black. The conductive filler is added during the initial stages of the pultrusion process such that the conductive filler is dispersed in the finished pellet. This dispersion is what enables the single pellets of the present invention to provide the enhanced benefits as compared to prior art dry blend solutions. By dispersing the conductive filler prior to extruding the resin through the die, the need for a separate pellet containing only the conductive filler is eliminated. However, not all conductive fillers are capable of being used in a pultrusion process.

A beneficial aspect that enables a low level of resistivity and, at the same time, good level mechanical properties to be obtained is the type of carbon black (CB). In one embodiment, the carbon black has a pore volume (DBP) of 480-510 ml/100 g and an iodine adsorption 1000-1100 mg/g. When these types of carbon blacks are used, and as compared to carbon blacks having a pore volume (DBP) of 310-345 ml/100 g and an iodine adsorption of 740-840 mg/g., molded parts showed an improved resistivity despite the same level loadings of conductive black. As such it was unexpectedly found that only these specific carbon blacks were able to be used in a pultrusion process to obtain a pellet that, when used to form a molded part, had improved resistivity and impact strength.

The amount of conductive filler used may very depending on the type of resin and the selected final properties of the molded article. However, as the conductive filler may interfere with the pultrusion process, it is beneficial for the pellet to contain 10 wt % or less of the conductive filler. In an alternative embodiment, the pellet contains 5 wt % or less of the conductive filler. The minimum amount of filler included is an amount sufficient to enable the selected conductivity to be achieved an may include amounts as low as 0.1 wt % or 0.5 wt % depending on one or more factors such as the conductive filler used, the type of polymer used and/or the amount of fiber reinforcement.

In addition to the thermoplastic resin, conductive filler and reinforcing fiber, the thermoplastic compositions used in the present invention may include various additives ordinarily incorporated in resin compositions of this type. Mixtures of additives may be used. Such additives may be mixed at a suitable time during the mixing of the components for forming the composition. The one or more additives are included in the thermoplastic compositions to impart one or more selected characteristics to the thermoplastic compositions and any molded article made therefrom. Examples of additives that may be included in the present invention include, but are not limited to, heat stabilizers, process stabilizers, antioxidants, light stabilizers, plasticizers, antistatic agents, mold releasing agents, UV absorbers, lubricants, pigments, dyes, colorants, flow promoters or a combination of one or more of the foregoing additives.

Suitable heat stabilizers include, for example, organo phosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

The pellets of the present invention may be formed using any known pultrusion method of forming fiber-reinforced pellets. In one embodiment, the resin and conductive filler are first blended in a high-speed mixer. Other low shear processes including but not limited to hand mixing may also accomplish this blending. The blend may then be fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. Fibers are then drawn through the molten resin and passed through a die. The strands may then be quenched in a water batch and pelletized. The pellets so prepared when cutting the extrudate may be one-fourth inch long or less as desired. Such pellets may be used for subsequent molding, shaping, or forming.

Shaped, formed, or molded articles made from the pellets of the present invention are also provided. The pellets can be molded into useful shaped articles by a variety of means such as injection molding, extrusion, rotational molding, blow molding and thermoforming to form articles. Due to the ability of the articles to be electrostatically painted as well as providing excellent physical properties, the articles are especially useful as metal replacements in a variety of electronic and automotive applications, as well as other applications.

Examples of articles that may be made using the compositions of the present invention include, but are not limited to, computer and business machine housings such as housings for monitors, hand held electronic device housings such as housings for cell phones, electrical connectors, and components of lighting fixtures, ornaments, home appliances, roofs, greenhouses, sun rooms, swimming pool enclosures, and the like.

The present invention is further illustrated by the following non-limiting examples.

EXAMPLES

In the first example, a comparison between a dry blend solution (formulation 1) and fully pultruted single pellet made according to the concepts of the present invention (formulation 2) was performed. The results may be seen in Table 1. The results reported in formulation 1, Table 1, were measured on molded parts obtained by dry blending two different kinds of pellets: the first pellets contained 92% wt. Of PA66 and 8% wt. of carbon black and the second pellets were long glass fiber pellets, length 12 mm, and contained 60% wt. of glass fiber and 40 wt % of PA66. The dry blend was comprised of 30% first pellets and 70% second pellets, thereby resulting in a 55.6% PA, 42% GF and 2.4% CB in the molded article. The total weight percentages for formulation 1 are given in Table 1.

Next, a formulation 2 was made according to the concepts of the present invention and was made via a pultrusion process. These pellets were formed such that they contained the same percentages of PA 66, long glass fiber and carbon black as per the effective percentages in the molded article as the dry blend in formulation 1.

The pultrusion process used conventional feeders and extruder to melt the thermoplastic resin, disperse the conductive filler and transport the blend into a melt bath. The glass fibers, supplied in the form of bobbins of continuous roving were pulled through the melt bath in such a manner as to provide substantial wetting of the fibers.

A die was used at the exit of the melt bath to meter the composition and give the correct fiber content of the finished pellets. A lace cutter was used to cut pellets of the required length typically 10 to 13 mm.

Finally, for comparison, the data of nylon 66 (PA 66) pellets containing 60% of long glass fiber (the second pellets from formulation 1) are set forth as formulation 3 and are also provided for comparison in Table 1.

As may be seen, it is apparent that Formulation 2, i.e. single pellets made according to the concepts of the present invention, showed mechanical properties that were similar or better then formulations 1 and 3, which are the dry blend mixture and the non-conductive formulation respectively. Formulations 1 and 2 have comparable specific volume resistivity (in the range $10^2$-$10^3$ Ohm/cm). It also apparent that formulation 2 showed mechanical properties similar or better then properties measured for formulation 3, which is not conductive. In fact, articles made from formulation 2 have been successfully electrostatically painted and showed good coverage and did not exhibit failure in the adhesion (measured according to cross hatch tape test, ASTM D 339) of the paint.

TABLE 1

|  | 1 | 2 | 3 |
|---|---|---|---|
| Glass Fibers | 42 | 42 | 60 |
| PA66 | 55.6 | 55.6 | 40.0 |
| Carbon Back (Ketjenblack EC 600 J) | 2.4 | 2.4 | 0.00 |
| Pellet length (mm) | 12 | 12 | 12 |
| Method of making | Dry blend | Single Pellets |  |
| SVR (specific volume resistivity) [Ohm · cm] | 200 | 1275 | 1.0E+14 |
| IZOD (Temp. = 23° C.) | Control | 12 |  |
| Izod Impact (notched) [kJ/m2] | 28.8 | 29.5 | 23.0 |
| Fracture mode [B/D] | 5xB | 5xB | 5xB |
| Tensile | Control | 12 | 9 |
| Tensile Modulus [Mpa] | 14353 | 14131 | 13582 |

TABLE 1-continued

| | | | |
|---|---|---|---|
| Stress @ Break [Mpa] | 205 | 219 | 219 |
| Strain @ Break [%] | 1.8 | 1.9 | 2.1 |
| Flexural | Control | 12 | 9 |
| Flexural Modulus [Mpa] | 12837 | 13111 | 11143 |
| Flexural Strength [Mpa] | 302.8 | 323.1 | 326.0 |
| Strain @ Break [%] | 2.4 | 2.6 | 3.1 |

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A pellet, comprising:
   a) from 30 to 70 wt % of a thermoplastic resin;
   b) from 20 to 60 wt % of a plurality of long reinforcing fibers aligned substantially parallel along a longitudinal axis of the pellet and having a length of at least 0.4 mm; and
   c) 0.1 to 10 wt % of a conductive filler dispersed in the pellet, wherein the conductive filler comprises carbon black having a pore volume (DBP) equal or greater than 480 ml/100 g and an iodine adsorption equal or greater than 1000 mg/g.

2. The pellet of claim 1, wherein the thermoplastic resin comprises a polyamide resin.

3. The pellet of claim 2, wherein the thermoplastic resin comprises nylon 66.

4. The pellet of claim 1, wherein the long reinforcing fibers comprise glass fibers.

5. The pellet of claim 1, wherein the conductive filler comprises a carbon black having a pore volume (DBP) of 480-510 ml/100 g and an iodine adsorption of 1000-1100 mg/g.

6. A method of forming a single conductive fiber reinforced pellet comprising the steps of:
   a) extruding from 30 to 70 wt % of a thermoplastic resin with 0.1 to 10 wt % of a conductive filler comprising carbon black having a pore volume (DBP) equal to or greater than 480 ml/100g and an iodine absorption equal or greater than 1000 mg/g to disperse the conductive filler in the thermoplastic resin and form a resin mixture;
   b) pulling from 20 to 60 wt % of reinforcing fibers through the resin mixture and into a heated die; and
   c) pelletizing the fiber reinforced resin mixture to form the single conductive fiber reinforced pellets such that the reinforcing fibers have a length of at least 0.4 mm.

7. The method of claim 6, wherein the thermoplastic resin comprises a polyamide resin.

8. The method of claim 7, wherein the thermoplastic resin comprises nylon 66.

9. The method of claim 6, wherein the long reinforcing fibers comprise glass fibers.

10. The method of claim 6, wherein the conductive filler comprises a carbon black having a pore volume (DBP) of 480-510 ml/100 g and an iodine adsorption of 1000-1100 mg/g and an iodine adsorption equal or greater than 1000 mg/g.

* * * * *